March 29, 1955 H. W. S. HUGHES ET AL 2,704,944
MEANS FOR ACTUATING A HAND-BRAKE ON A VEHICLE
Filed Nov. 27, 1953 2 Sheets-Sheet 1
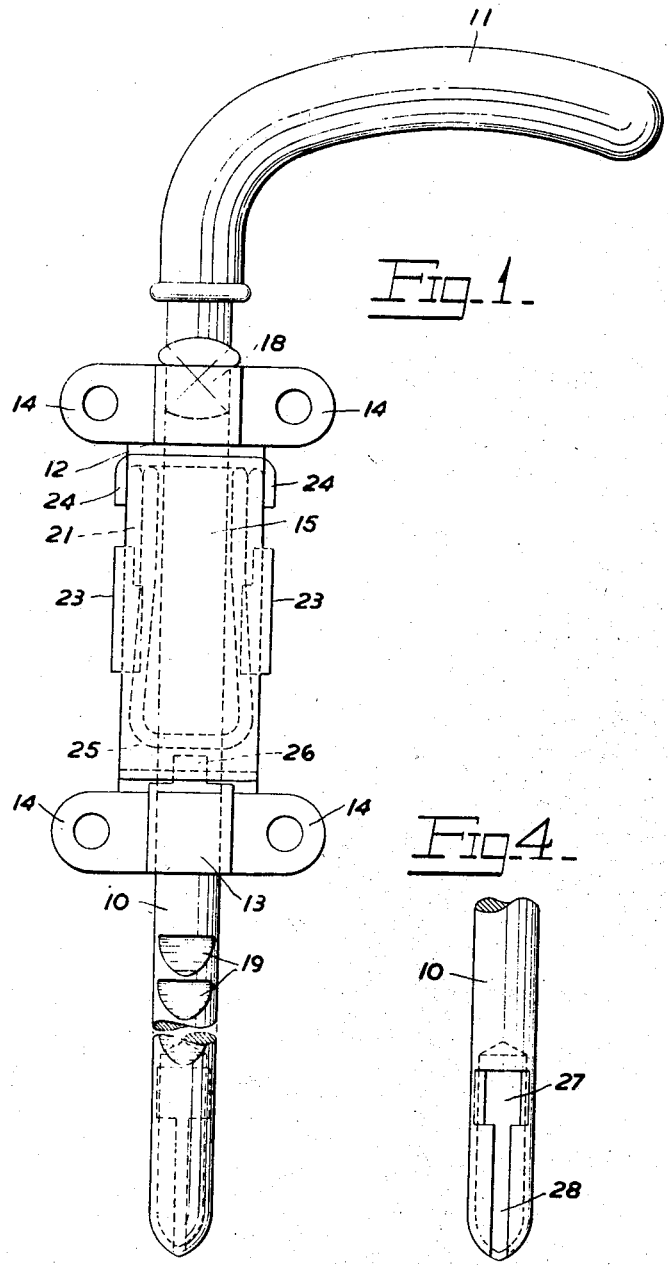
INVENTORS
HERBERT WILLIAM SAMUEL HUGHES
DAVID GORDON BONNER
by Walter S. Pleston
ATTORNEY

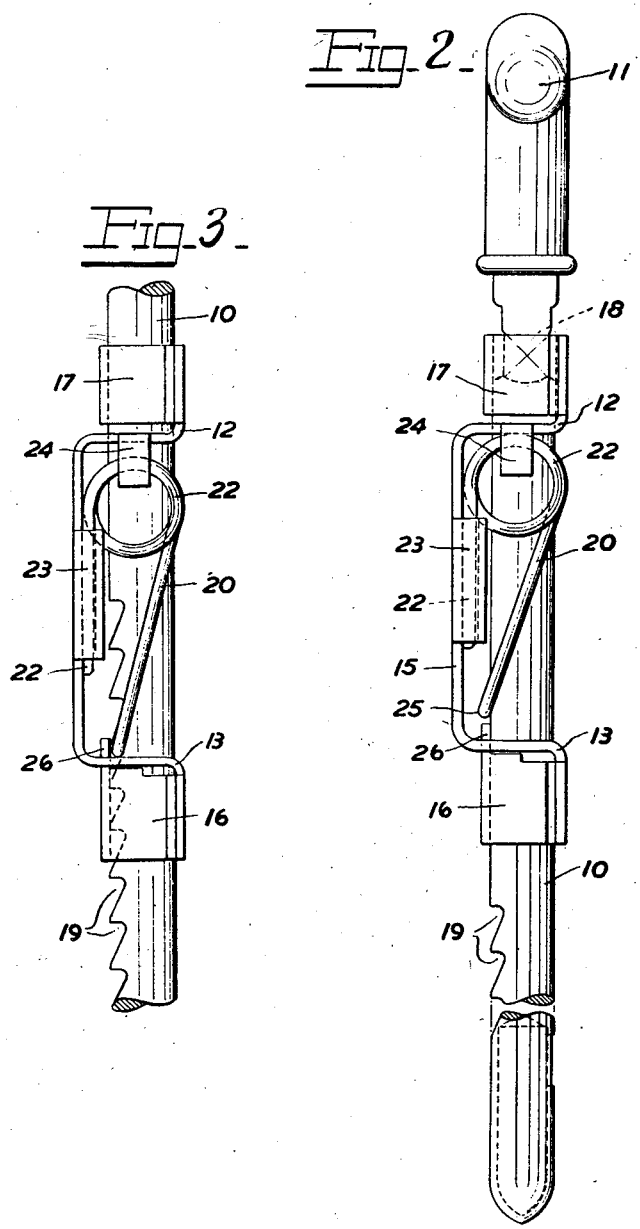

United States Patent Office 2,704,944
Patented Mar. 29, 1955

2,704,944

MEANS FOR ACTUATING A HAND-BRAKE ON A VEHICLE

Herbert William Samuel Hughes, Handsworth Wood, Birmingham, and David Gordon Bonner, Bentley Heath, Knowle, England, assignors to Girling Limited, Birmingham, England, a British company Application November 27, 1953, Serial No. 394,848

Claims priority, application Great Britain January 26, 1953

3 Claims. (Cl. 74—503)

This invention relates to means for actuating a hand-brake on a vehicle.

One known operating means comprises a rod which is movable axially in a fixed housing or bracket, the rod having a handle on one end and being connected at the other end by a cable or other transmission member to the rear brakes. The rod is provided with ratchet teeth co-operating with a spring-pressed detent to hold the brake applied and the brake is released by turning the rod angularly to disengage the ratchet teeth from the dent. One of the disadvantages of that arrangement is that as the brake is released by a single angular movement of the handle it may be released by a child or may even be released accidentally by a person entering or leaving the vehicle.

According to our invention, in actuating mechanism of the kind described above for a vehicle brake ratchet teeth on the axially movable rod co-operate with a spring-pressed detent which has a limited movement parallel to the rod and which in its normal engaged position with the brake applied is in alignment with an abutment which prevents the rod from being moved angularly to disengage the ratchet teeth from the detent and release the brake.

To release the brake the rod must be moved further in the brake applying direction and it takes the detent with it until the detent is clear of the abutment, whereupon the rod can be moved angularly to disengage the ratchet teeth from the detent.

A substantial effort is required to move the rod further in the brake applying direction and this effort cannot be made by a child or effected accidentally so that the risk of the brake being released unintentionally is reduced to a minimum.

The detent and abutment may be arranged in various ways.

One practical form of actuating mechanism for a vehicle brake in accordance with our invention is illustrated by way of example in the accompanying drawings in which:

Figure 1 is a plan of the complete mechanism.
Figure 2 is a side elevation with the brake in the "off" position.
Figure 3 is a fragmentary side elevation showing the parts in the positions they assume when the brake is applied.
Figure 4 is a fragmentary plan of the end of the axially movable rod remote from the handle.

In the drawings 10 is an axially movable rod which has a handle 11 at one end and is adapted at the other end to be connected to a cable leading to a brake or brakes. The rod is mounted for sliding movement in a bracket adapted to be secured to a convenient part of a vehicle such as the dash or scuttle. The bracket is a sheet metal pressing having two spaced end parts 12, 13, with laterally projecting lugs 14 pierced to receive bolts or screws and a flat intermediate part 15 which is parallel to but stepped down below the rod. A tubular guide 16 for the rod is welded or otherwise secured to the part 13 of the bracket and a similar guide 17 is secured to the part 12. The guide 17 may be of non-circular cross-section to receive a part 18 of complementary cross-section on the rod adjacent to the handle when the mechanism is in the "off" position so that the handle and rod are then positively located against angular movement.

Ratchet teeth 19 of buttress-form are provided on one side of the rod 10, and in the normal position of the rod are on the side of the rod next the part 15 of the bracket. When the rod is moved axially to apply the brake these teeth co-operate with a detent mounted in the bracket.

The detent comprises a spring 20 of the rat-trap type. It is formed from a length of stout steel wire bent to U-shape with a coil 21 in each limb. The free end 22 of each limb extends tangentially from the coil and is slidably guided in a channel guide 23 which is parallel to the rod and is formed from a lug integral with the part 15 of the bracket at each side. The coils 21 are spaced apart at a distance greater than the diameter of the rod and lie on opposite sides of the rod between lugs 24 projecting from the part 12 of the bracket. The base or closed end 25 of the spring which connects and is at right angles to the limbs forms the actual detent and is resiliently urged against the surface of the rod. The depth of the notches between the teeth 19 on the rod is substantially equal to the diameter of the wire from which the detent spring is made. The length of the spring is less than the spacing between the end parts of the bracket so that the spring is capable of a limited movement in the direction of the axis of the rod, but in the "brake off" position of the parts shown in Figures 1 and 2 radial movement of the spring is prevented by an abutment 26 comprising a tongue of substantial width projecting forwardly from the part 13 of the bracket, the abutment being closely adjacent to the surface of the rod.

When the brake is applied by pulling the rod 10 forwardly by means of the handle the rod slides through the bracket and the spring tends to move with it but is prevented from doing so by its engagement with the outer part 12 of the bracket. When the toothed part of the rod passes into the bracket the detent 25 rides over the teeth successively until the brake is fully applied. The handle is then released and the tension in the brake transmission line pulls the rod rearwardly for a short distance, taking the spring with it. The detent 25 lies within one of the notches in the rod and is carried into the position shown in Figure 3 in which it lies between the abutment 26 and the rod and is locked in the particular notch in which it is engaged, a stop for the rearward movement of the rod being provided by the engagement of the detent against the face of the part 13 of the bracket.

The rod 10 cannot now be moved angularly to release the brake as the notches and abutment are of substantial width and on any attempted angular movement of the rod the detent 25 is jammed between the rod and the abutment.

To release the brake the rod 10 must be drawn forwardly, taking the spring with it, far enough to carry the detent clear of the abutment, and the rod can then be turned through an angle of 90° to move the ratche. teeth out of alignment with the detent which slides on the smooth surface of the rod as the rod moves rearwardly.

Preferably, as shown in Figures 1 and 2, the first tooth on the rod lies to the rear of the detent in the "off" position of the brake so that when the rod is turned back to its normal angular position the detent engages a plain part of the rod and lies immediately in front of the abutment 26 ready to enter into the notches when the rod is drawn forwardly again to apply the brake.

The rear end of the rod is conveniently formed, as shown in Figure 4, with a notch 27 leading into an axial recess 28 to receive the usual nipple on the end of the cable leading to the brakes.

We claim:

1. Actuating mechanism for a parking brake on a vehicle comprising a stationary housing, a rod guided for axial sliding movement in the housing, said rod having a handle on one end and being adapted for connection to a transmission member leading to the brake, a series of spaced notches in one face of said rod, a spring-pressed detent mounted in the housing for limited sliding movement therein parallel to the rod and for co-operation with said notches from which it can be disengaged by angular movement of the rod, and an abutment on said housing for retaining said detent in a notch in the rod when the brake is applied by axial movement of the rod and for preventing the rod from being moved angularly to disengage the detent until further movement of the rod in the brake-applying direction moves the detent clear of the abutment.

2. Actuating mechanism for a parking brake as in claim 1 wherein said detent is a member transverse to the rod and resiliently urged against the rod, and the abutment is a rigid tongue on the housing which lies sufficiently close to the surface of the rod to allow the detent to pass between the abutment and the rod only when the detent lies in a notch in the rod.

3. Actuating mechanism for a parking brake as in claim 1 wherein said detent comprises a transverse part of a spring formed from steel wire bent to U-outline with a coil in each limb, the free ends of the limbs being slidably guided in the housing for movement in a direction parallel to the rod, and the spring being movable with the rod between abutments on the housing spaced apart at a distance greater than the length of the spring.

References Cited in the file of this patent

UNITED STATES PATENTS

| | | |
|---|---|---|
| 1,838,289 | Smith | Dec. 29, 1931 |
| 2,274,133 | Fergueson | Feb. 24, 1942 |
| 2,367,892 | Schallis | Jan. 23, 1945 |
| 2,377,691 | Jandus | June 5, 1945 |
| 2,640,242 | Weimer | June 2, 1953 |